No. 857,956. PATENTED JUNE 25, 1907.
H. MUELLER.
PIPE CONNECTION.
APPLICATION FILED MAY 7, 1906.
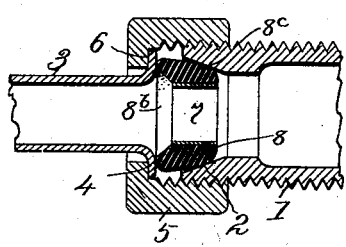
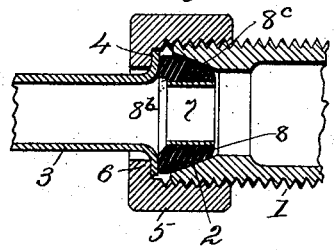
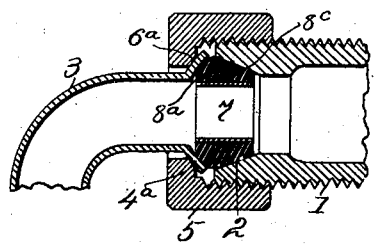
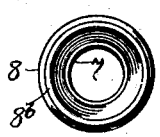
Witnesses.
Ina C. Graham
Nora Graham
Inventor,
Henry Mueller,
by L. P. Graham
his attorney.

UNITED STATES PATENT OFFICE.

HENRY MUELLER, OF DECATUR, ILLINOIS, ASSIGNOR TO H. MUELLER MANUFACTURING COMPANY, OF DECATUR, ILLINOIS.

PIPE CONNECTION.

No. 857,956.        Specification of Letters Patent.        Patented June 25, 1907.

Application filed May 7, 1906. Serial No. 315,702.

*To all whom it may concern:*

Be it known that I, HENRY MUELLER, a resident of the city of Decatur, county of Macon, and State of Illinois, have invented certain new and useful Improvements in Pipe Connections, of which the following is a specification.

This invention is particularly applicable to the connecting of pipes with bath cocks and with basin cocks, although not confined to said uses, and the object is to provide a secure and durable connection which will not be affected by any ordinary heat and which may be loosened and re-tightened repeatedly without impairing the joint.

The invention is exemplified in the structures hereinafter described and it is defined in the appended claims.

In the drawings forming part of this specification Figures 1, 2 and 3 are sections lengthwise through pipe connections embodying my improvements and Fig. 4 is an end view of the joint ring of the connection.

In Fig. 1 the parts are shown as they appear before the joint ring is compressed, in Fig. 2 the joint ring is shown compressed and in Fig. 3 a modification of my invention is represented.

An externally-threaded section of pipe is shown at 1, said section in this instance being in the form of a tail piece of a bath cock or a basin cock, and the connecting end of the tail piece is internally flared, or tapered, as shown at 2. The pipe 3 has its connecting end radially flanged as shown at 4. The coupling nut 5 is internally screw-threaded to engage the tail piece 1 and it has the internal shoulder 6 against which the flanged end of pipe 3 abuts. A lead joint-ring 8 has at one end a salient annular bearing surface 8ᵇ which extends beyond the body of the ring and bears against the flange 4 of pipe 3, and the external surface of the remainder of the joint ring is tapered somewhat and rounded longitudinally in order to bring a rather narrow surface into contact with the flared surface of the tail piece preparatory to compressing the ring in the forming of a connection. A ring 7 of brass, or other comparatively stiff metal fits inside the joint-ring and keeps the internal diameter thereof in shape.

In Fig. 3 the flange 4ᵃ of pipe 3 is concavo-convex to form a ball-joint bearing against the rounded end or salient bearing surface 8ᵃ of the joint-ring and the bearing edge 6ᵃ of the shoulder of the coupling nut is chamfered to conform to the shape of the flange.

When the parts are arranged in place preparatory to completing a connection, the salient part 8ᵇ of the joint-ring bears against the flange 4 of the pipe 3 and the flared inner surface of the connecting end of the tail piece bears against a comparatively narrow rounded surface of the joint ring. As the coupling nut is screwed onto the tail piece, to complete the connection, the stiff metal ring holds the joint-ring from collapsing, the salient bearing surface 8ᵇ flattens against the flange and the rounded outer surface of the joint ring is pressed into close and more extended contact with the flared surface of the tail piece; all as shown in Fig. 2.

In completing a joint in the manner described, with the construction shown in Figs. 1, 2 and 4, the parts may be made to conform to as much variation in alinement of the conjoined pipe sections as is likely to exist under ordinary circumstances, but when it is desired to provide for an unusual degree of disalinement the construction may be as shown in Fig. 3 and the flange may be swung to a considerable extent between the joint-ring and the shoulder of the coupling nut, after the manner of a ball-bearing.

The flanges 4 and 4ᵃ are formed on the ends of pipes 3, and are therefore entirely stable and secure. This mode of providing a ring or collar for a coupling nut of a pipe connection is of utility apart from the special form of joint-ring herein described.

The lead ring is unaffected by the action of any heat developed in pipes under ordinary circumstances and it will stand repeated loosening and retightening, or re-adjusting, of the coupling without becoming in any manner impaired or inoperative.

By making the sustaining ring separate from the pipe sections to be conjoined, the flange of the pipe section 3 may be formed by pressure and the other pipe section 1 may be cast, both at a reduced cost of construction. The sustaining ring does not necessarily enter or fit either section, although it is possible that one of its ends may be pushed into one of the sections in the act of making a connection. However, it is not contemplated that this will take place, as the sole function of the sustaining ring is to prevent the joint-ring from collapsing. To these ends the sustaining ring is made as short as possible—never longer and sometimes shorter than the length of the joint-ring. When it is shorter the salient end $8^b$ of the joint-ring projects longitudinally beyond the corresponding end of the sustaining ring as shown in Figs. 1 and 2, because the pressure from the flange 4 is longitudinal. When said flange is oblique as shown at $4^a$ and its pressure is both longitudinal and inward, the salient portion $8^a$ of the joint-ring is an oblique projection, and the sustaining ring 7 by preference extends the full length of the joint-ring. In either case the salient portion projects in a direction substantially at right angles to the face of the flange which is to bear against it in the act of making a connection, whereby this end of the joint-ring will be compressed in such manner that it will be pressed upon the sustaining ring while the flaring mouth of the pipe section will compress the remaining portion of the joint-ring. If it should happen in this action that the inner wall of either pipe section should strike its end of the sustaining ring, the fact that the joint-ring is of soft material will allow the sustaining ring to be moved slightly while the joint-ring is being compressed into position; but I consider this eventuality quite unlikely, because ordinarily the sustaining ring is shorter than the joint-ring even in its compressed condition.

I claim as new and desire to secure by Letters Patent:—

1. A connecting ring for pipe joints comprising a stiff metal cylindrical sustaining ring and a soft metal joint-ring surrounding said sustaining ring for all of its length and having a tapered exterior and a salient projection at its thicker end which projection is rounded on its outer face.

2. A connecting ring for pipe joints comprising a stiff metal cylindrical sustaining ring and a soft metal joint-ring surrounding said sustaining ring for all of its length and having a tapered exterior and a salient projection at its thicker end on a line at right angles to the face of the part to be brought against it.

3. A connecting ring for pipe joints comprising a stiff metal cylindrical sustaining ring and a soft metal joint-ring surrounding said sustaining ring for all of its length and having a tapered exterior and an annular salient projection at its thicker end extending beyond one end of the sustaining ring and parallel with its axis.

4. A pipe joint comprising an externally-threaded pipe section internally flared at its connecting end, a second pipe section having an exterior flange at its extremity, a coupling nut internally threaded to fit said external threads and having an internal shoulder at one end swiveled on said second pipe section behind its flange, a yielding joint-ring having a salient projection at one end adapted to rest against said flange and a tapered exterior adapted to fit into said flaring end, and a stiff sustaining ring within and no longer than said joint-ring.

5. A pipe joint comprising an externally threaded pipe section internally flared at its connecting end, a second pipe section having an exterior right angular flange at its extremity, a coupling nut internally threaded to fit said external threads and having an internal right angular shoulder at one end swiveled on said second pipe section behind its flange, a yielding joint-ring having a salient longitudinal projection at one end adapted to rest against said flange and a tapered exterior adapted to fit into said flaring end, and a stiff sustaining ring within and shorter than the joint-ring.

In testimony whereof I sign my name in the presence of two subscribing witnesses.

HENRY MUELLER.

Witnesses:
E. A. SKELLEY,
JOHN L. WADDELL.